(12) United States Patent
Thomas

(10) Patent No.: US 7,962,483 B1
(45) Date of Patent: Jun. 14, 2011

(54) ASSOCIATION RULE MODULE FOR DATA MINING

(75) Inventor: Shiby Thomas, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 10/323,997

(22) Filed: Dec. 20, 2002

(51) Int. Cl.
*G06F 7/00* (2006.01)

(52) U.S. Cl. ........................... 707/736; 707/755

(58) Field of Classification Search .............. 707/2, 3, 707/6, 736, 755
See application file for complete search history.

(56) References Cited

U.S. PATENT DOCUMENTS

| | | | | |
|---|---|---|---|---|
| 5,615,341 A * | 3/1997 | Agrawal et al. | ............... | 705/10 |
| 5,758,147 A * | 5/1998 | Chen et al. | ............... | 707/6 |
| 5,794,209 A * | 8/1998 | Agrawal et al. | ............... | 705/10 |
| 5,812,997 A * | 9/1998 | Morimoto et al. | ............... | 707/2 |
| 5,813,003 A * | 9/1998 | Chen et al. | ............... | 707/6 |
| 5,842,200 A * | 11/1998 | Agrawal et al. | ............... | 707/1 |
| 5,870,748 A * | 2/1999 | Morimoto et al. | ............. | 707/101 |
| 5,884,305 A * | 3/1999 | Kleinberg et al. | ............... | 707/6 |
| 5,920,855 A * | 7/1999 | Aggarwal et al. | ............... | 707/3 |
| 5,943,667 A * | 8/1999 | Aggarwal et al. | ............... | 707/3 |
| 5,983,222 A * | 11/1999 | Morimoto et al. | ............... | 707/6 |
| 6,141,656 A * | 10/2000 | Ozbutun et al. | ............... | 707/3 |
| 6,278,998 B1 * | 8/2001 | Ozden et al. | ............... | 707/6 |

OTHER PUBLICATIONS

Agrawal et al., "Fast Algorithms for Mining Association Rules", 1994, Proceedings of the 20th VLDB Conference, pp. 1-13.*

Gardarin et al., "Bitmap Based Algorithms for Mining Association Rules", Oct. 1998, Actes Des Journes Bases De Donnes Avances (BDA '98), pp. 1-19.*

Sarawagi et al., "Integrating Association Rule Mining with Relational Database Systems: Alternatives and Implications", 1998, ACM, 0-89791-995-5/98/006, pp. 343-354.*

Shenoy et al., "Turbo-charging Vertical Mining of Large Databases", 2000, ACM, 1-58113-218-2/00/05, pp. 22-33.*

Thomas et al., "An Efficient Algorithm for Incremental Updation of Association Rules in Large Databases", 1997, American Association for Artificial Intelligence, pp. 1-4.*

Thomas et al., "Incremental Mining of Constrained Associations", 2000, Proceedings of the 7th International Conference on High Performance Computing, pp. 547-558.*

Thomas et al., "Mining Generalized Association Rules and Sequential Patterns Using SQL Queries", 1998, American Association for Artificial Intelligence, pp. 1-5.*

\* cited by examiner

*Primary Examiner* — Don Wong
*Assistant Examiner* — Michael Le
(74) *Attorney, Agent, or Firm* — Murphy & King, P.C.

(57) ABSTRACT

A system, software module, and computer program product for performing association rule based data mining that improved performance in model building, good integration with the various databases throughout the enterprise, flexible specification and adjustment of the models being built, and flexible model arrangement and export capability. The software module performs association rule based data mining in an electronic data processing system. A model setup block operable to receive client input including information specifying a setup of a association rule data mining models, generate the model setup, generate parameters for the model setup based on the received information. A modeling algorithms block operable to select and initialize a association rule modeling algorithm based on the generated model setup, and a model building block operable to receive training data and build a association rule model using the training data and the selected association rule modeling algorithm.

24 Claims, 13 Drawing Sheets

Fig. 11

| | 1102 DATA TABLE | | | |
|---|---|---|---|---|
| | COLUMN 1 NAME | COLUMN 2 ADDRESS | ••• | COLUMN N |
| RECORD 1 | NAME 1 | ADD. 1 | ••• | |
| ••• | | | | |
| RECORD N | NAME N | ADD. N | | |

1104A
1104N
1106A
1106B

ASSOCIATION RULE MODULE FOR DATA MINING

FIELD OF THE INVENTION

The present invention relates to an association rule module that generates association rule data mining models.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior.

The use of association rules is an important technique that is useful for data mining. Association rules capture co-occurrence of items or events in large volumes of data, such as customer transaction data. The widespread adoption of barcode technology has made it possible for retail organizations to collect and store massive amounts of sales data. Likewise, the more recent growth of online sales also generates large amounts of sales data. Collectively, such sales data is termed "basket" data. Originally, association rules were defined in the context of basket data. For example, an association rule based on basket data might be defined as: 90% of customers who buy both snow boots and jackets also buy ski equipment. Finding such rules is valuable for cross marketing and mail order promotions. Other applications may include catalog design, add-on sales, store layout, customer segmentation, web page personalization, and target marketing.

Problems arise when attempts are made to utilize current data mining systems to perform enterprise data mining. Current systems that perform association rule analysis tend to provide inadequate performance for large datasets, and in particular, do not provide scalable performance. This leads to it taking hours or even days to build a single model. In the context of enterprise data mining, a wide variety of models must be generated to meet specific, but widely different needs throughout the enterprise. A typical enterprise has a variety of different databases from which data is drawn in order to build the models. Current systems do not provide adequate integration with the various databases throughout the enterprise. Likewise, current systems provide limited flexibility in terms of specifying and adjusting the model being built to meet specific needs. Likewise, the various models that are built must be arranged so as to operate properly on the particular system within the enterprise for which the models were built. Current systems provide limited model arrangement and export capability.

A need arises for a technique by which association rule analysis may be performed that provides improved performance in model building, good integration with the various databases throughout the enterprise, flexible specification and adjustment of the models being built, flexible model arrangement and export capability, and expandability to additional types of datasets.

SUMMARY OF THE INVENTION

The present invention is a system, software module, and computer program product for performing association rule based data mining that provides improved performance in model building, good integration with the various databases throughout the enterprise, flexible specification and adjustment of the models being built, flexible model arrangement and export capability, and expandability to additional types of datasets.

In one embodiment, a method of performing association rule based data mining in an electronic data processing system comprises the steps of providing a dataset comprising a plurality of data entries, each data entry comprising information relating to an item or event, counting each occurrence of each item or event in each data entry in the dataset, generating, for each item or event, a compilation of data entries that include each item or event, determining frequent itemsets, each itemset including a plurality of items or events in the dataset, and generating a support count for each frequent itemset. The step of counting each occurrence of each item or event in each data entry in the dataset may comprise the step of generating a count array comprising a first column including a plurality of identifiers, each identifier identifying an item or event in the dataset, and a second column comprising a plurality of counts, each count indicating a number of occurrences of an item or event identified by a corresponding identifier.

In one embodiment, the step of generating, for each item or event, a compilation of data entries that include each item or event comprises the step of generating a vertical representation comprising a column including a plurality of identifiers, each identifier identifying an item or event in the dataset and a list including for each identifier, an identifier of a data entry including the item or event identified by the identifier.

In one embodiment, the step of generating, for each item or event, a compilation of data entries that include each item or event comprises the step of generating a vertical representation comprising a column including a plurality of identifiers, each identifier identifying an item or event in the dataset and a list including for each identifier, a bit vector indicating, for each data entry in the dataset, whether the data entry includes the item or event identified by the identifier. The method may further comprise the step of compressing the vertical representation. The compressing step may comprise the step of compressing the bit vectors using byte-aligned bitmap compression. The step of determining frequent itemsets may comprise the steps of generating an array of counts of occurrences of multiple items or events in the same data entry. The array of counts of occurrences of multiple items or events in the same data entry may include only the more frequently occurring occurrences. The more frequently occurring occurrences may be determined by counting occurrences of multiple items or events in the same data entry for only the more frequently occurring items or events as determined using the count array. The step of generating a support count for each frequent itemset may comprise the step of determining support counts for a range of sizes of itemsets.

In one embodiment, the software module for performing association rule based data mining in an electronic data processing system comprises: a model setup block operable to receive client input including information specifying a setup of a association rule data mining models, generate the model setup, generate parameters for the model setup based on the received information, a modeling algorithms block operable to select and initialize a association rule modeling algorithm based on the generated model setup, and a model building block operable to receive training data and build a association rule model using the training data and the selected association rule modeling algorithm.

The software module may further comprise a data preprocessing block operable to receive the training data, process the received training data, and transmit the processed training data to the model building block. The processing performed by the data preprocessing block may comprise normalization of data and/or binning of continuous data into categories.

The software module may further comprise a model analysis block operable to statistically analyze the association rule model. The software module may further comprise a status monitoring block operable to monitor a model-building progress of the model building block and output notification of the model-building progress of the model building block. The model building block may be further operable to monitor the client input for an interrupt. The model building block may be further operable to, in response to receiving an interrupt, abort the model build or checkpoint the model build. The model building block may be further operable to periodically checkpoint a model build.

BRIEF DESCRIPTION OF THE DRAWINGS

The details of the present invention, both as to its structure and operation, can best be understood by referring to the accompanying drawings, in which like reference numbers and designations refer to like elements.

FIG. 11 is an exemplary format of a training data table.

DETAILED DESCRIPTION OF THE INVENTION

Figure 1:
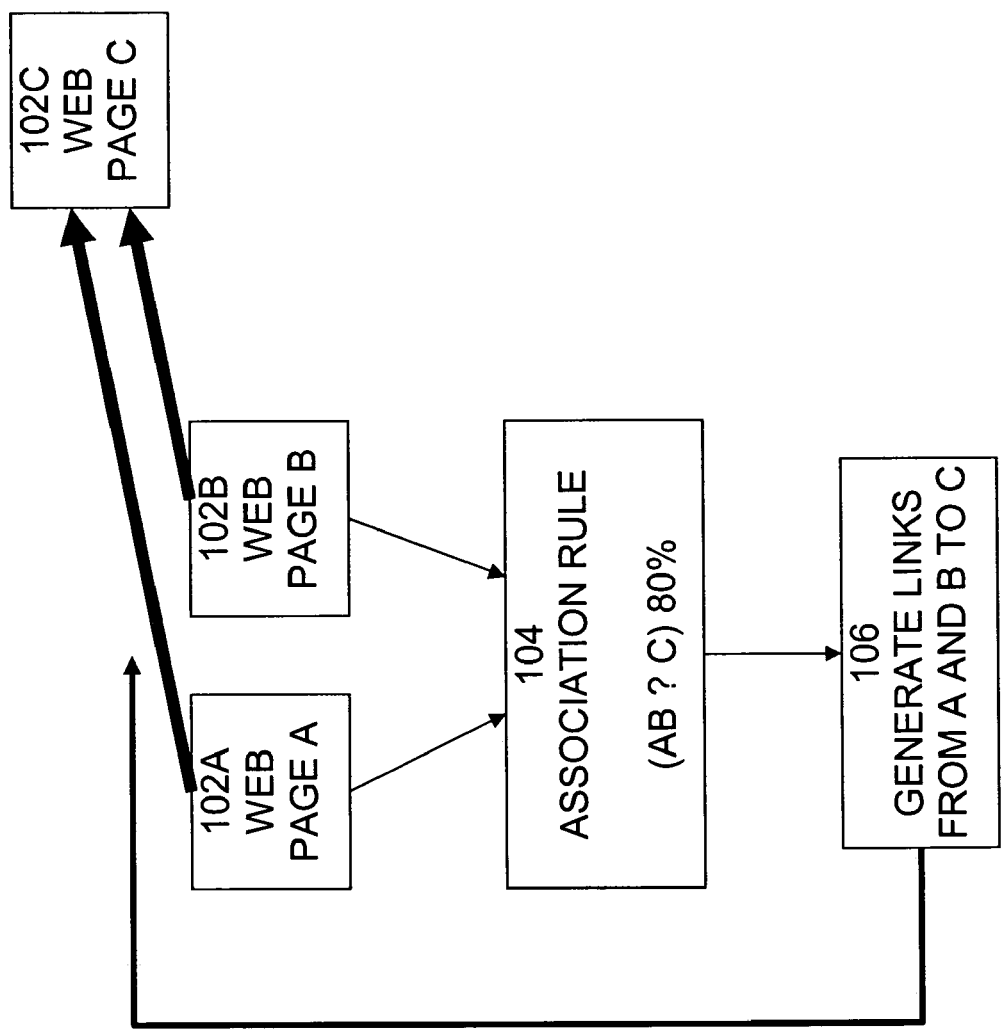
FIG. 1 is an exemplary block diagram of the use of association rules to predict web page access for personalization.

Traditionally, association rule analysis has been used for discovering business trends by analyzing customer transactions. However, association rules analysis can also be used effectively in other applications. For example, association rules can be developed to predict web page access for personalization. Such an example is shown in FIG. 1. In FIG. 1, there are shown three Web pages 102A, 102B, and 102C. There is an association rule 104 that indicates that, if a user visits Web pages 102A and 102B, then there is an 80% chance that the user will visit Web page 102C during the same session. Web page 102C may or may not have a direct link from Web pages 102A or 102B. Association rule 104 may then be used to dynamically generate 106 direct links from Web pages 102A and 102B to Web page 102C. These links then allow the user to "click-through" directly to Web page 102C. This technique may be used in an e-commerce application to generate links to appropriate product pages. The technique may also be used to dynamically generate Web pages that are personalized based on the user's behavior.

Figure 2:
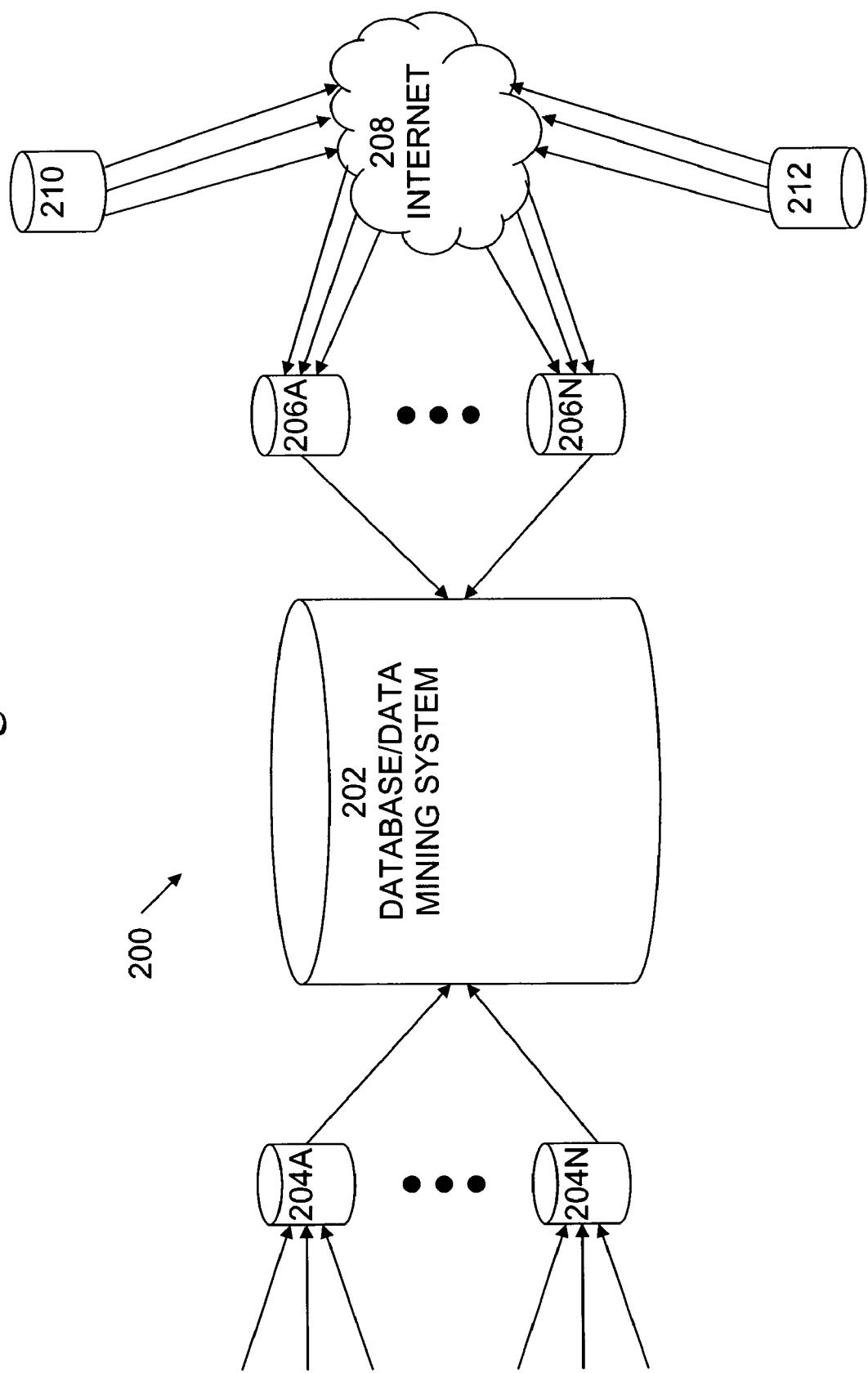
FIG. 2 is an exemplary block diagram of a data mining system, in which the present invention may be implemented.

An exemplary data mining system 200, in which the present invention may be implemented, is shown in FIG. 2. System 200 includes a database/data mining system 202 that is connected to a variety of sources of data. For example, system 202 may be connected to a plurality of internal or proprietary data sources, such as systems 204A-204N. Systems 204A-204N may be any type of data source, warehouse, or repository, including those that are not publicly accessible. Examples of such systems include inventory control systems, accounting systems, scheduling systems, etc. System 202 may also be connected to a plurality of proprietary data sources that are accessible in some way over the Internet 208. Such systems include systems 206A-206N, shown in FIG. 2. Systems 206A-206N may be publicly accessible over the Internet 208, they may be privately accessible using a secure connection technology, or they may be both publicly and privately accessible. System 202 may also be connected to other systems over the Internet 208. For example, system 210 may be privately accessible to system 202 over the Internet 208 using a secure connection, while system 212 may be publicly accessible over the Internet 208.

The common thread to the systems connected to system 202 is that the connected systems all are potential sources of data for system 202. The data involved may be of any type, from any original source, and in any format. System 202 has the capability to utilize and all such data that is available to it.

Figure 3:
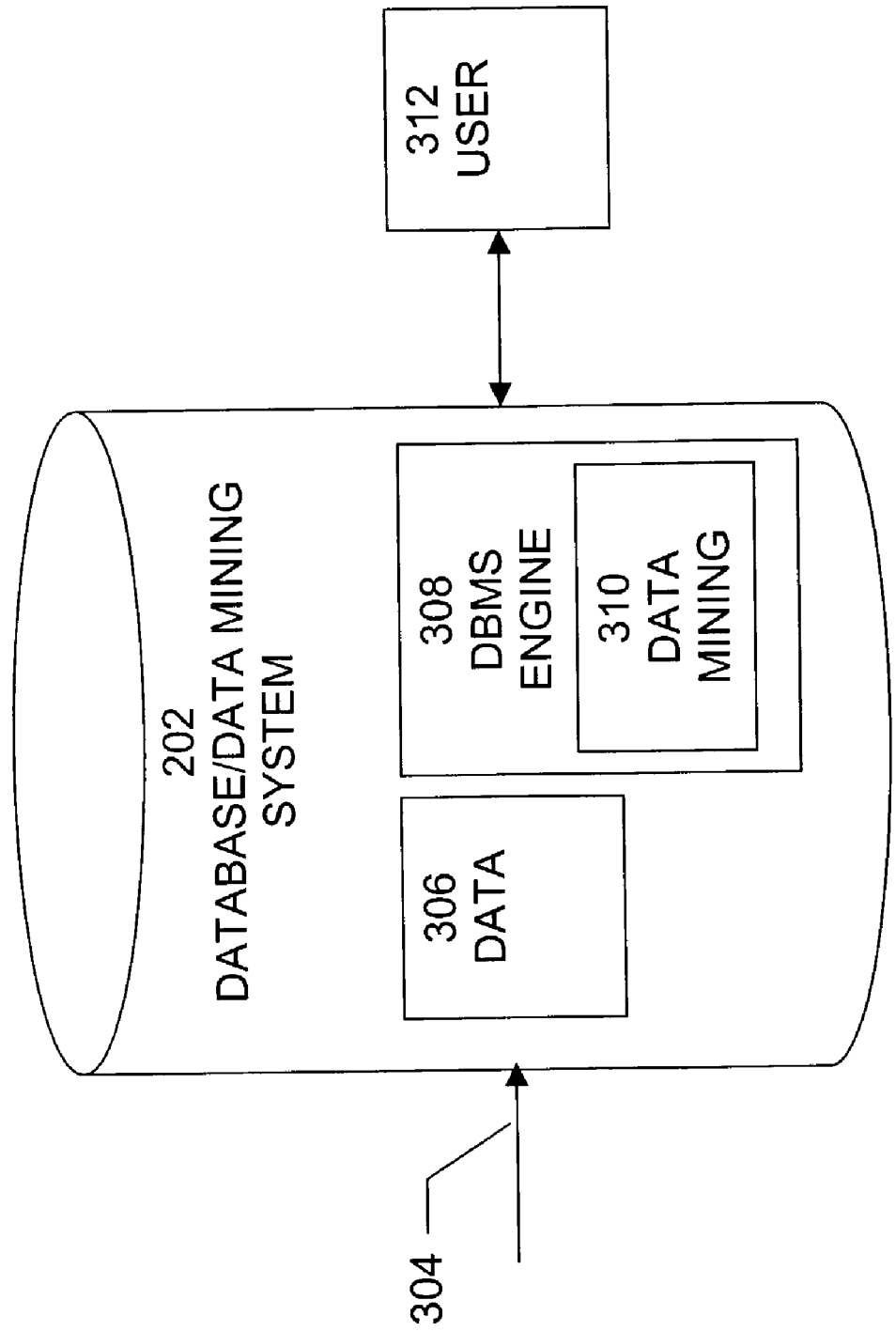
FIG. 3 is an exemplary block diagram of a database/data mining system shown in FIG. 2.

An exemplary embodiment of database/data mining system 202 is shown in FIG. 3. System 202 is a database management system that includes data mining functionality. Database management system 202 is connected to data sources 304, such as the proprietary and public data sources shown in FIG. 2. Database management system includes two main components, data 306, and database management system (DBMS) engine 308. Data 306 includes data, typically arranged as a plurality of data tables, such as relational data tables, as well as indexes and other structures that facilitate access to the data. DBMS engine 308 typically includes software that receives and processes queries of the database, obtains data satisfying the queries, and generates and transmits responses to the queries. DBMS engine 308 also includes data mining block 310, which provides DBMS engine 308 with the capability to obtain data and perform data mining processing on that data, so as to respond to requests for data mining processed data from one or more users, such as user 312.

Figure 4:
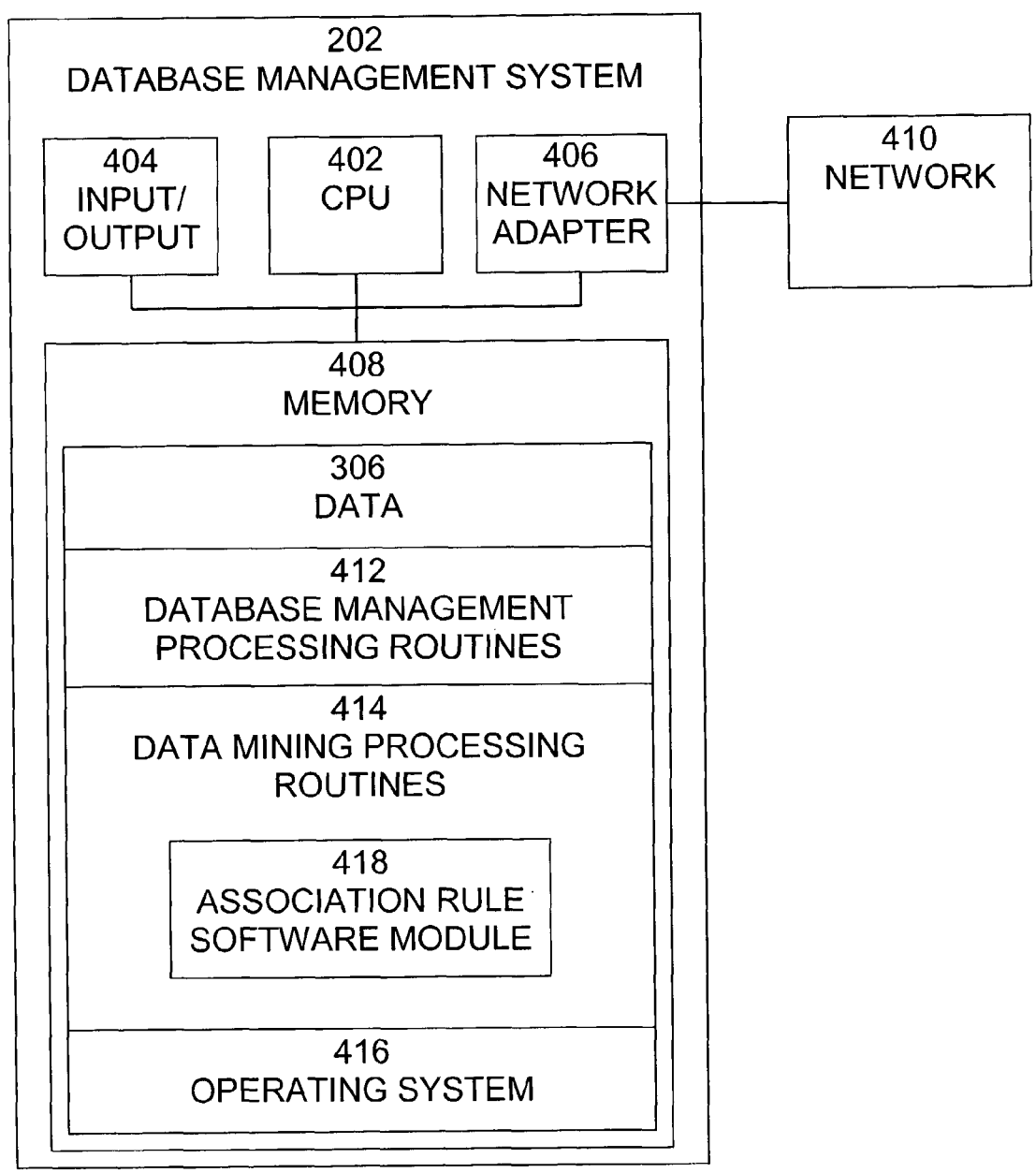
FIG. 4 is an exemplary block diagram of a database/data mining system shown in FIG. 2.

An exemplary block diagram of a database/data mining system 202, shown in FIG. 2, is shown in FIG. 4. Database/data mining system 202 is typically a programmed general-purpose computer system, such as a personal computer, workstation, server system, and minicomputer or mainframe computer. Database/data mining system 202 includes processor (CPU) 402, input/output circuitry 404, network adapter 406, and memory 408. CPU 402 executes program instructions in order to carry out the functions of the present invention. Typically, CPU 402 is a microprocessor, such as an INTEL PENTIUM® processor, but may also be a minicomputer or mainframe computer processor. Input/output circuitry 404 provides the capability to input data to, or output data from, database/data mining system 202. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database/data mining system 202 with network 410. Network 410 may be any standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of the database/data mining system 202. Memory 408 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 408 includes data 306, database management processing routines 412, data mining processing routines 414, and operating system 416. Data 306 includes data, typically arranged as a plurality of data tables, such as relational database tables, as well as indexes and other structures that facilitate access to the data. Database management processing routines 412 are software routines that provide database management functionality, such as database query processing. Data mining processing routines 414 are software routines that implement the data mining processing performed by the present invention. In particular, data mining processing routines 414 include association rule based software module (association rule module) 418, which performs the association rule based data mining of the present invention. Preferably, this data mining processing is integrated with database management processing. For example, data mining processing may be initiated by receipt of a database query, either in standard SQL or in the form of extended SQL statements. Operating system 416 provides overall system functionality.

Figure 5:
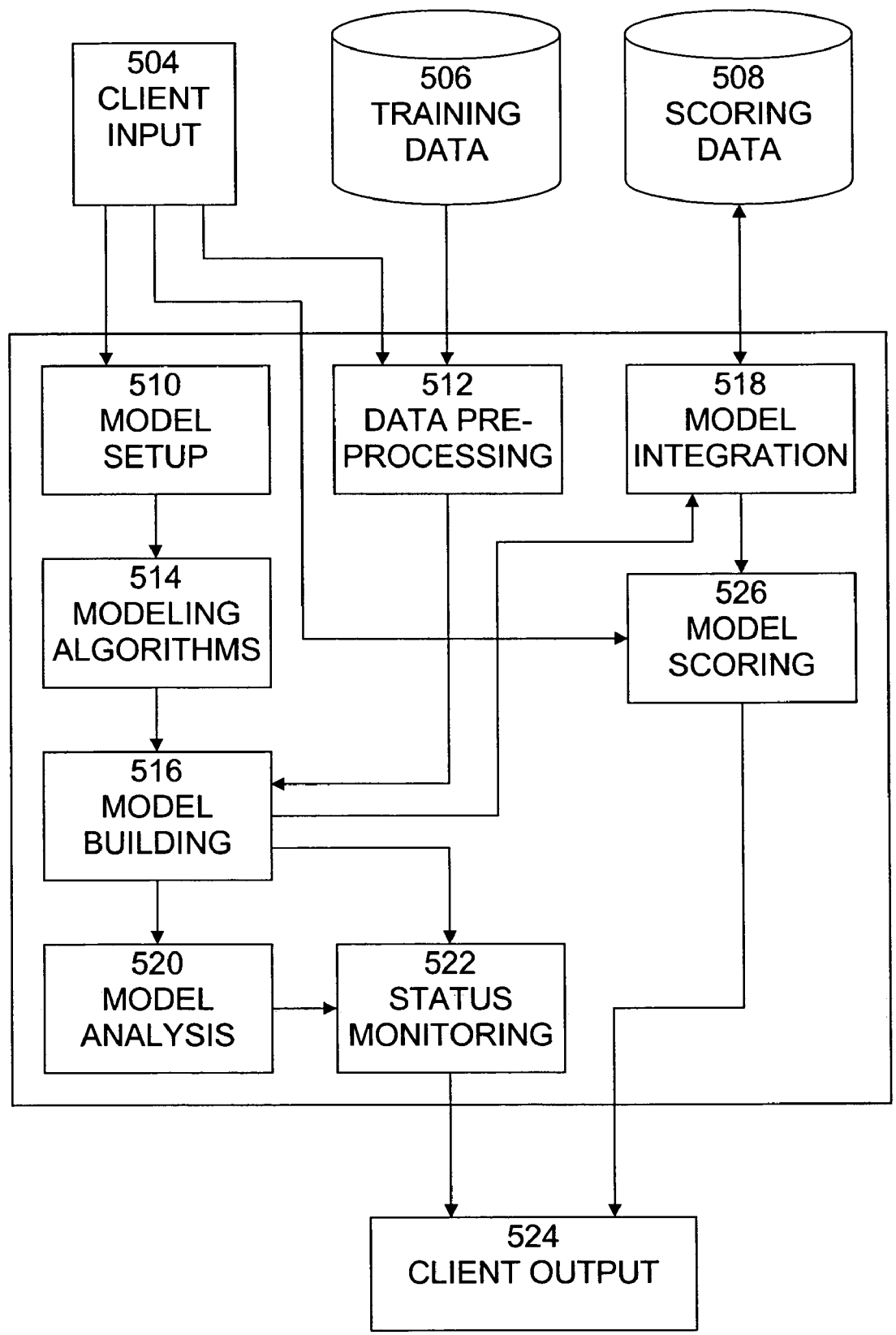
FIG. 5 is an exemplary functional block diagram of a association rule module for data mining.

A functional block diagram of a association rule module 418 for data mining, according to the present invention, is shown in FIG. 5. Association rule module 418 receives input such as client input 504 and training data 506 and interacts with scoring data 508. Model setup block 510 receives client input 504 that includes information specifying setups of association rule data mining models. For example, client input 504 may include information specifying a number of clusters to be used in a data mining model, a type of association rule model to be built, such as a self-organizing map, a k-means model, a competitive learning model, etc., and other parameters that are specific to the type of model selected. Model setup block 510 generates the model setups that are used in building the models and generates appropriate parameters for the model setup based on the received information.

Data preprocessing block 512 receives training data 506, preprocesses the training data, and transmits the processed data to model building block 516. Thus, data preprocessing block processes the training data before the data is used to build a model. For example, numeric columns within training data 506 may be normalized to restrict the range of the data or to eliminate outliers. Likewise, columns of continuous data may be binned to form categorical columns, which reduces the number of unique values present in the data. Data preprocessing block 512 may perform default or predefined processing, or data preprocessing block 512 may receive client input that includes information defining the bins to be used or defining the type of normalization to be performed.

Modeling algorithms block 514 selects and initializes the appropriate modeling algorithm based on the model setup that is generated by model setup block 510. This provides the capability to generate models that are appropriate for different modeling needs, as specified by the client. Factors such as speed, data visualization, ease of tuning, on-line, incremental learning, and batch learning may be supported.

Model building block 516 receives a preprocessed training dataset from data preprocessing block 512 and builds a association rule model using the training dataset and the selected association rule modeling algorithm. Model building block 516 builds the association rule model based on the available data columns in the dataset. Columns that have been marked to be ignored, or that are keys, are ignored. The resulting built model is used by model integration block 518 to integrate the model with scoring data 508 that is contained in other datasets. In particular, each data row in another dataset that has similar columns to the training dataset is marked with an identifier of a cluster that the data in the data row is most similar to. This greatly enhances the performance when the association rule model is used to make predictions. In addition, the association rule model may be deployed into the database system itself, in which case the database system can itself use the model to make predictions.

Model building block 516 monitors client input for interrupts to the model building process. Depending upon the nature of the interrupt, model building block 516 may abort the model build or it may checkpoint the model build for later resumption. Checkpointing involves saving the complete state of the model build, and includes saving all information necessary to resume the model build from the point of interruption. In addition to checkpointing in response to a client interrupt, model building block 516 also periodically checkpoints the model build. Should a system failure occur that interrupts the model build, only the work done since the last checkpoint is lost, rather than the entire model build.

After a model has been built, model analysis block 520 statistically analyzes the model and validates the dataset. Model analysis block 520 computes statistics on the data represent by each cluster in the model. These statistics may then be used to check if a new dataset was generated by the same data generated mechanism as the dataset used for training the model.

Status monitoring block 522 monitors the model-building progress of model building block 516 and periodically outputs to the client 524 notification of that progress.

Model scoring block 526 receives a scoring dataset, applies the scoring dataset to the built and integrated model, and generates predictions and/or recommendations using the scoring dataset and the model.

Figure 6:
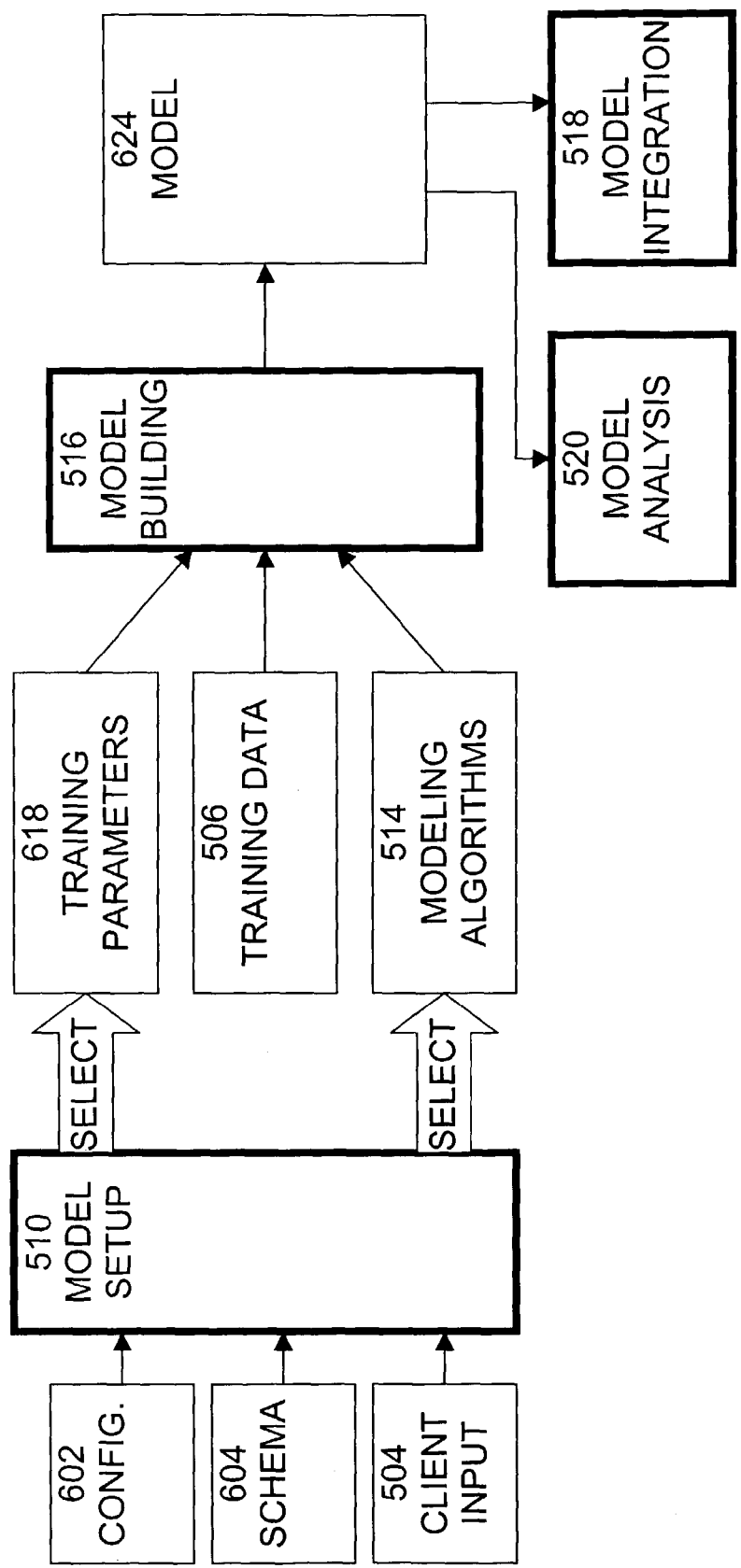
FIG. 6 is an exemplary data flow diagram of a model building process performed by the association rule module shown in FIG. 5.

A data flow diagram of a model building process, performed by association rule module 418, shown in FIG. 5, is shown in FIG. 6. Model building involves building the models, in this case, association rule models, which are used to perform online recommendation and prediction. A configuration 602 defines the information, such as items, products, attributes, etc. that may of interest for the user in a particular universe. A schema 604 defines the types of models that are to be built in specific situations. Client input 504 includes information that allows the user to control the building of association rule data mining models. Typical inputs for Association rule mining are support and confidence thresholds. The configuration 602, the schema 604, and the client input 504 are input to model setup step 510, which sets up the models for training. In particular, model setup step 510 selects the modeling algorithms 514 that process the training data in order to actually build the models. In addition, model setup step 510 generates and sets training parameters 618. Training parameters 618 are parameters that are input to the algorithms to control how the algorithms build the models. Training data 506 is data that is input to the algorithms that is used to actually build the models. Training parameters 618, the selected modeling algorithm, and training data 506 are input to model building block 516.

Model building block 516 invokes the selected modeling algorithm, initializes it using the training parameters 618, processes training data 506 using the modeling algorithm, and generates model 624. Model 624 includes a set of rules that implement the conditions and decisions that make up an operational model. Model 624, including the set of rules, is input to model analysis block 520, which statistically analyzes the model and validates the dataset. Model analysis block 520 computes statistics on the data represent by each cluster in the model. These statistics may then be used to check if a new dataset was generated by the same data generated mechanism as the dataset used for training the model. Model 624 is also output to model integration block 518.

Figure 7:
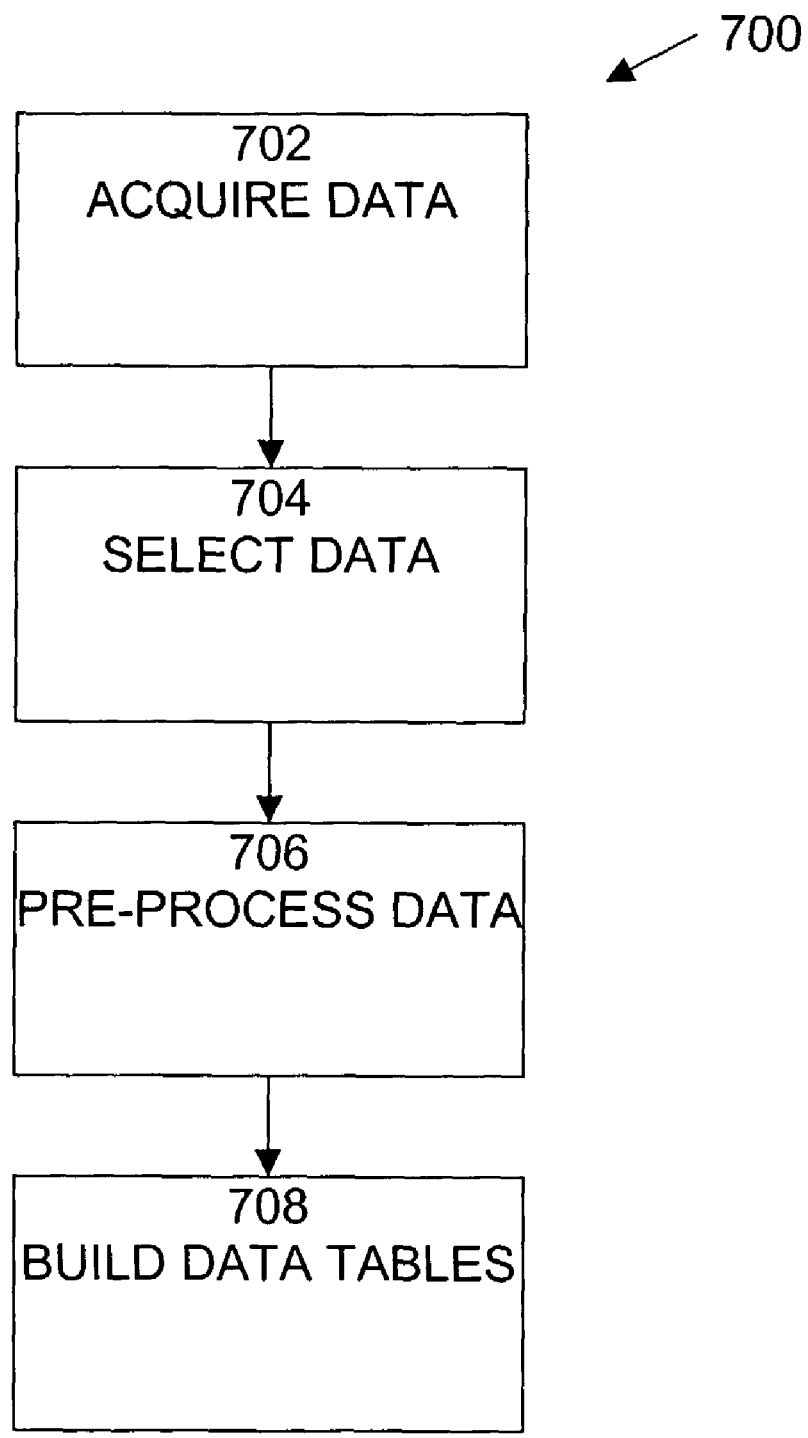
FIG. 7 is an exemplary flow diagram of processing performed by the association rule module shown in FIG. 5.

Processing 700, including processing performed by data preprocessing block 512 is shown in FIG. 7. Process 700 collects and processes data in order to generate data in a form usable by for the data mining processing performed by the present invention. Process 700 begins with step 702, in which training data 506, shown in FIG. 5, is acquired from the data sources with which the data mining system operates, such as corporate databases, which provide corporate customer data, external databases, which provide complementary customer data, Web transaction database, which provide web transaction and visitor data, and Web server database, which provides web server data. In step 704, data that is relevant to the desired output from the system is selected from among the data that has been acquired. In step 706, the selected data is pre-processed to ensure that the data is usable, properly formatted, etc. For example, numeric columns within training data 506 may be normalized to restrict the range of the data or to eliminate outliers. Likewise, columns of continuous data may be binned to form categorical columns, which reduces the number of unique values present in the data. Default or predefined processing may be performed, or client input may be received that includes information defining the bins to be used or defining the type of normalization to be performed. In step 708, the data tables that are used by the system to build association rule models are built and stored.

Association rule data mining searches for interesting relationships among items in a given dataset. For example, it may be desired to learn more about the buying habits of customers of a particular enterprise. A specific question may be: "Which groups or sets of items are customers likely to purchase in a given transaction'?" To answer this question, market basket analysis may be performed on the retail data of customer transactions. The results may be used to plan marketing or advertising strategies, as well as catalog or Web site design.

Given a set of items, then each item may be represented by a Boolean variable that indicates the presence or absence of that item in a customer's basket. Each basket can then be represented by a Boolean vector of values assigned to these variables. The Boolean vectors can be analyzed for buying patterns that reflect items that are frequently associated or purchased together. These patterns can be represented in the form of association rules. For example, the information that customers who purchase computers also tend to buy financial management software at the same time may be represented as:

computer=>financial_management_software
[support=2%, confidence=60%]

Rule support and confidence are two measures that respectively reflect the usefulness and certainty of discovered rules. A support of 2% for the rule illustrated above means that 2% of all the transactions under analysis show that computer and financial management software are purchased together. A confidence of 60% means that 60% of the customers who purchased a computer also bought the software. Typically, association rules may be considered interesting if they satisfy both a minimum support threshold and a minimum confidence threshold. Such thresholds can be set by users or domain experts.

Association rules may be described more analytically as follows: Let $J=\{i_1, i_2, \ldots, i_m\}$ be a set of items. Let D, the task-relevant data, be a set of database transactions where each transaction T is a set of items such that $T \subset J$. Each transaction is associated with an identifier, called TID. Let A be a set of items. A transaction T is said to contain A if and only if $A \subset T$. An association rule is an implication of the form $A \Rightarrow B$, where $A \subset J, B \subset J$, and $A \cap B = \phi$. The rule $A \Rightarrow B$ holds in the transaction set D with support s, where s is the percentage of transactions in D that contain $A \cup B$ (i.e., both A and B). This is taken to be the probability, $P(A \cup B)$. The rule $A \Rightarrow B$ has confidence c in the transaction set D if c is the percentage of transactions in D containing A that also contain B. This is taken to be the conditional probability, $P(B|A)$. That is, support $(A \Rightarrow B) = P(A \cup B)$
confidence $(A \Rightarrow B) = P(B|A)$.

Rules that satisfy both a minimum support threshold (min_sup) and a minimum confidence threshold (min_conf) are called strong.

A set of items is referred to as an itemset. An itemset that contains k items is a k-itemset. The set {computer, financial_management_software} is a 2-itemset. The occurrence frequency of an itemset is the number of transactions that contain the itemset. This is also known, simply, as the frequency, support count, or count of the itemset. An itemset satisfies minimum support if the occurrence frequency of the itemset is greater than or equal to the product of min_sup and the total number of transactions in D. The number of transactions required for the itemset to satisfy minimum support is therefore referred to as the minimum support count. If an itemset satisfies minimum support, then it is a frequent itemset.

Figure 8:
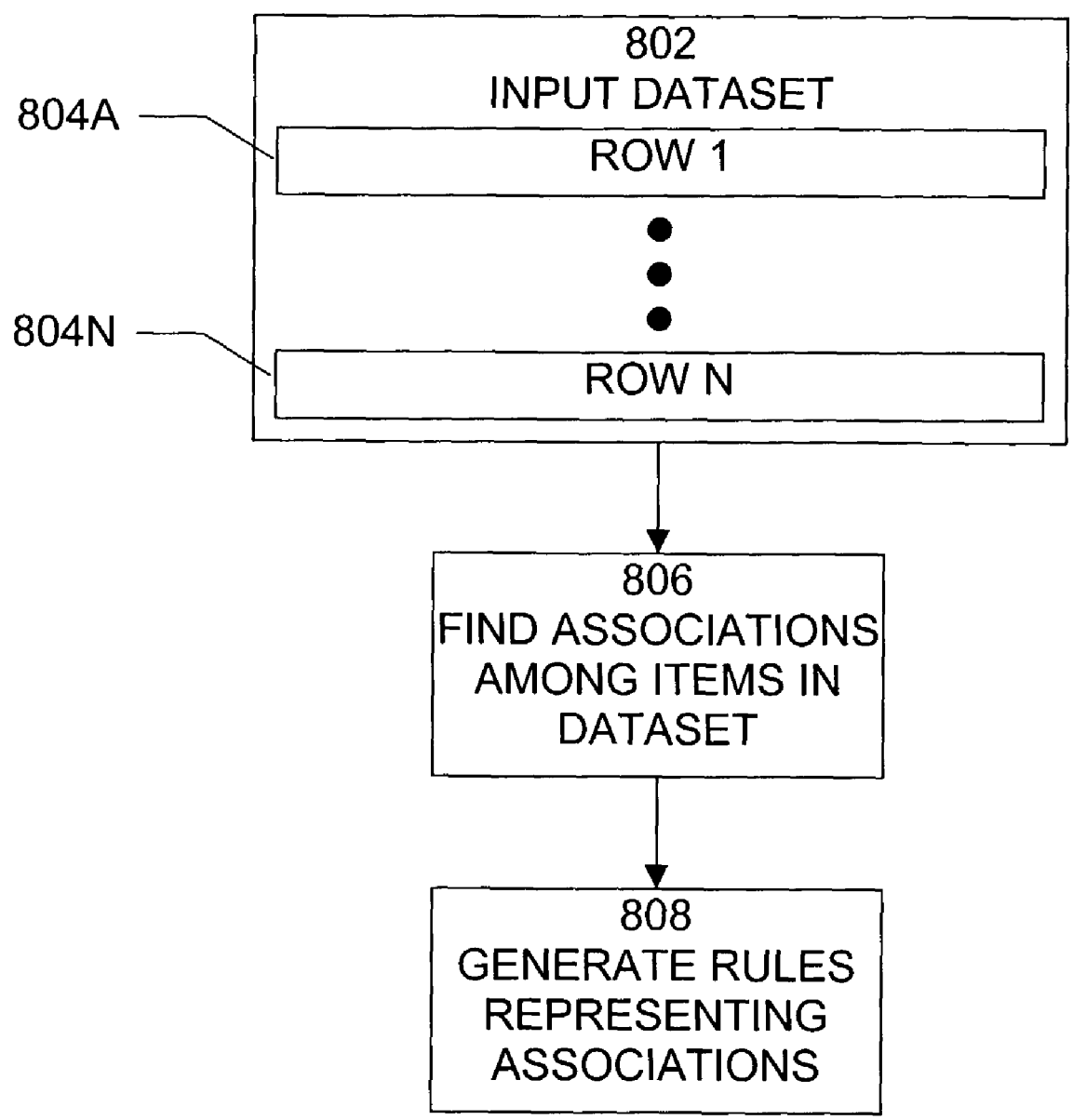
FIG. 8 is an exemplary data flow diagram of a process performed by the association rule module shown in FIG. 5

An exemplary data flow diagram of a process performed by association rule model building block 516, which is shown in FIG. 5, is shown in FIG. 8. Input dataset 802, which includes a plurality of rows of data 804A-804N. Each row of data, such as row 804A, represents an individual data entry, which in turn represents an event such as a transaction, a Web page access, etc. In step 806, the data entries are processed to find associations among the items included in the data entries. In particular, step 806 involves determining the frequent itemsets, that is, those itemsets that satisfy minimum support criteria. By definition, each of these itemsets will occur at least as frequently as a pre-determined minimum support count. In step 808, the association rule data mining model is built by generating strong association rules from the frequent itemsets: By definition, these rules must satisfy minimum support and minimum confidence.

The processing performed in step 806, that of finding the frequent itemsets in the dataset is typically the most expensive part of the processing, in terms of compute time expended.

Figure 9:
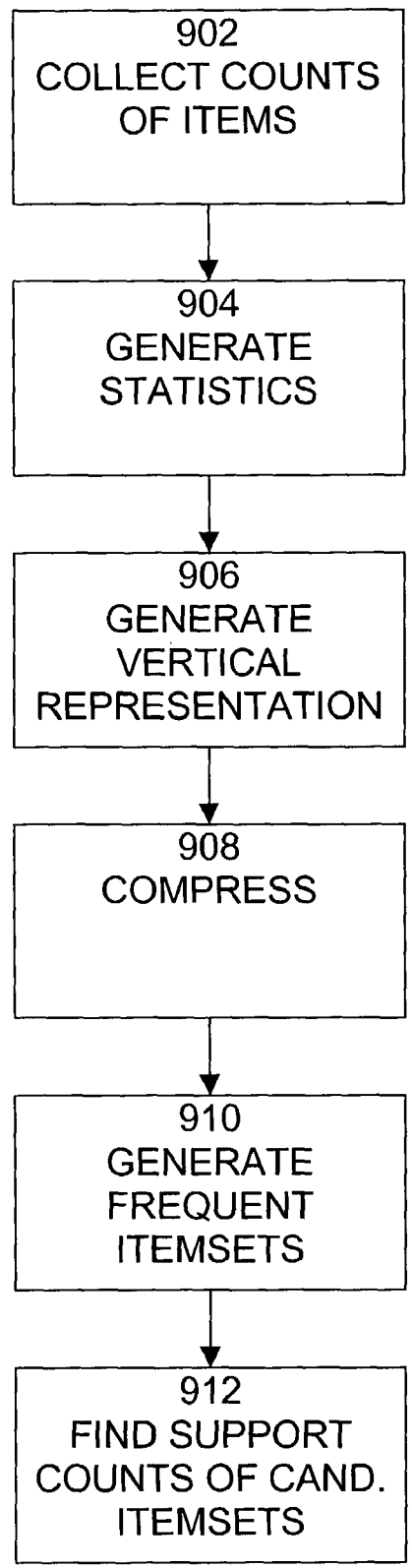
FIG. 9 is an exemplary flow diagram of processing performed by a step shown in FIG. 8.
Figure 10A:
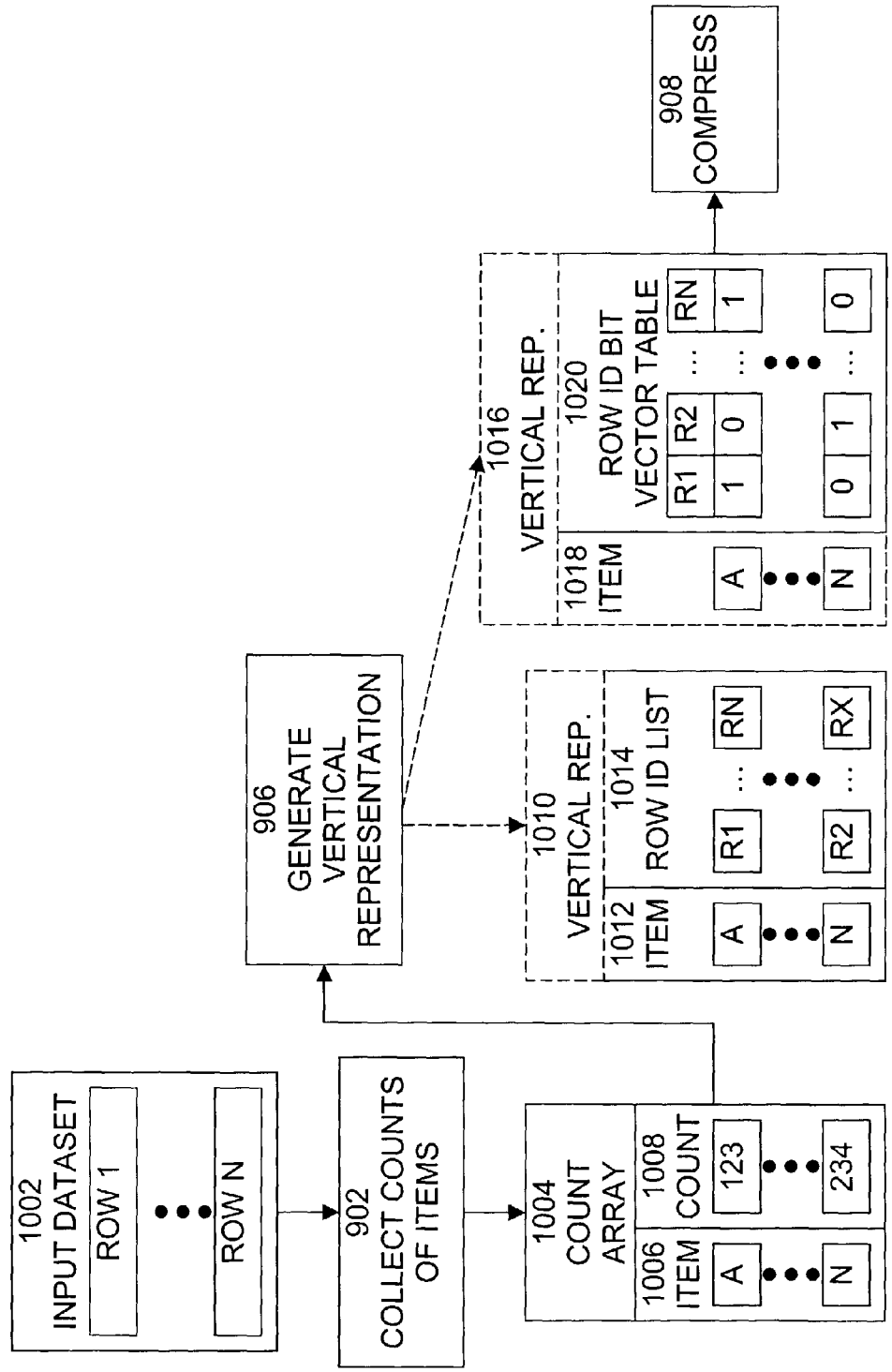
FIG. 10*a* is an exemplary data flow diagram of processing performed by the process shown in FIG. 9.

The steps performed in order to carry out step 806 of FIG. 8 are shown in FIG. 9. FIG. 9 is best viewed in conjunction with FIGS. 10*a* and 10*b*, which are data flow diagrams of the processing performed in FIG. 9. In step 902, input dataset 1002 is processed in order to collect counts of items included in the entries of dataset 1002. In particular, each occurrence of each item or event in each data entry in dataset 1002 is counted. The counts are collected to form a count array 1004, which includes an item column 1006 that includes identifiers of the items included in the entries of dataset 1002 and a count column 1008 that includes corresponding counts of the occurrences of the items in dataset 1002. In step 904, statistics relating to dataset 1002 are generated.

In step 906, a vertical representation of dataset 1002 is generated. The vertical representation is a compilation or list, for each item or event, of the data entries that include each item or event. There are two alternative embodiments of vertical representations of dataset 1002. In one embodiment, vertical representation 1010 includes item column 1012, which includes identifiers of the items included in the entries of dataset 1002, and row identifier list 1014, which includes, for each item identifier in item column 1012, a list of those rows in dataset 1002 that include the item. For each item identifier in item column 1012, row identifier list 1014 lists only those rows that include the item. As each row corresponds to a transaction or to an event, row identifier list 1014 represents transactions or events that involve each item in dataset 1002.

Alternatively, vertical representation 1016 includes item column 1018, which includes identifiers of the items included in the entries of dataset 1002, and row identifier bit vector table 1020, which includes, for each item identifier in item column 1018, a bit vector indicating those rows in dataset 1002 that include the item. For each item in item column 1018, the bit vector includes a bit position for each row in dataset 1002. The setting of the bit at each position indicates whether the item is included in that row. As each row corresponds to a transaction or to an event, row identifier bit vector 1020 represents transactions or events that involve each item in dataset 1002. Preferably, the data is sorted in an item identifier, row identifier order before generating the bit vectors. This enables the generation of the bit vectors for all items in item column 1018 in one pass with relatively limited memory usage. This technique also facilitates writing out the bit vectors of only the frequent items to secondary storage, which significantly improves performance.

In step 908, the vertical representation is compressed in order to conserve storage space. For example, if vertical representation 1016 is used, bit vector table 1020 may be compressed using a byte-aligned bitmap compression scheme.

Figure 10B:
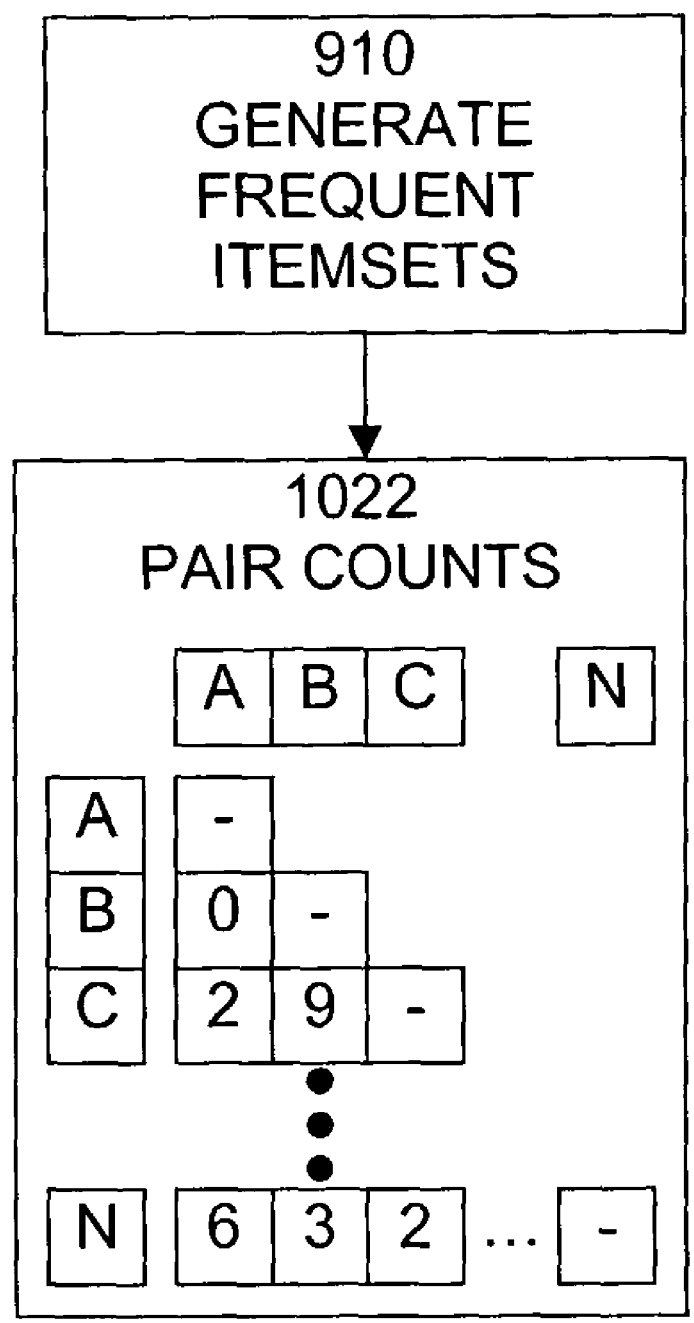
FIG. 10*b* is an exemplary data flow diagram of processing performed by the process shown in FIG. 9.

Typically, steps 902-908 are performed during a first pass through dataset 1002. Step 910 is typically performed during a second pass. In step 910, the most frequent itemsets are generated. That is, the most frequently occurring sets of items in dataset 1002 are identified and become candidate itemsets. This may be done by counting each occurrence of multiple occurrences of items or events in the dataset. To improve processing performance, a multi-dimensional array of multiple occurrence counts is generated. For example, a two-dimensional array of pair counts 1022, shown in FIG. 10*b*, is generated. Array 1022 includes the pair-wise counts of the more frequently occurring items. That is, the counts of the occurrence of pairs of items in dataset 1002 are collected in the form of a two-dimensional array. While pair count array 1022 may include the counts of all items pairs in dataset 1002, it is preferable to remove the least frequently occurring pairs before generating array 1022. This may be performed by loading the bit vectors from table 1020 of the more frequently occurring items, as determined by count array 1004, into memory and constructing the events on-the-fly before using them to increment the pair-wise counts of the corresponding items. Alternatively, the pair-wise intersection of the bit vectors of the more frequent items may be computed and the number of events in the intersection may be counted.

In step 912, the support counts of the candidate itemsets, which were generated in step 910, are generated. The support counts are typically generated during a number of subsequent passes. In one technique, one pass is required for each size of candidate itemset for which a support count is to be determined. However, the number of passes may be reduced if support counts can be determined for a range of sizes of candidate itemsets during one pass. For example, the bit vectors from table 1020 corresponding to the items present in the candidate itemsets may be intersected and the number of intersections counted. Once the most frequent itemsets are determined, the support counts of all candidates within a particular size range may be determined by generating all such candidates and arranging them in a lattice. This technique can thus reduce the number of passes required.

An exemplary format of a training data table 1102 is shown in FIG. 11. Data table 1102 includes a plurality of rows or records of data, such as records 1104A-1104N. Each record represents an individual set of data in data table 1102. Each record includes a plurality of fields of data, each field containing an individual piece of data of a defined type and subject matter. When arranged in a tabular format, the fields of the records form columns such as columns 1106A-1106B, with each column representing a particular type and subject matter of data. For example, in FIG. 11, column 1106A represents "NAME" and contains names, column 1106B represents "ADDRESS" and contains addresses. Likewise, record 1104A includes a name field and an address field. In order to build a association rule model from a dataset, a set of records is processed. The data in the columns of the set of records is preprocessed by data preprocessing block 512, shown in FIG. 5, then processed to form the association rule model.

Figure 12:
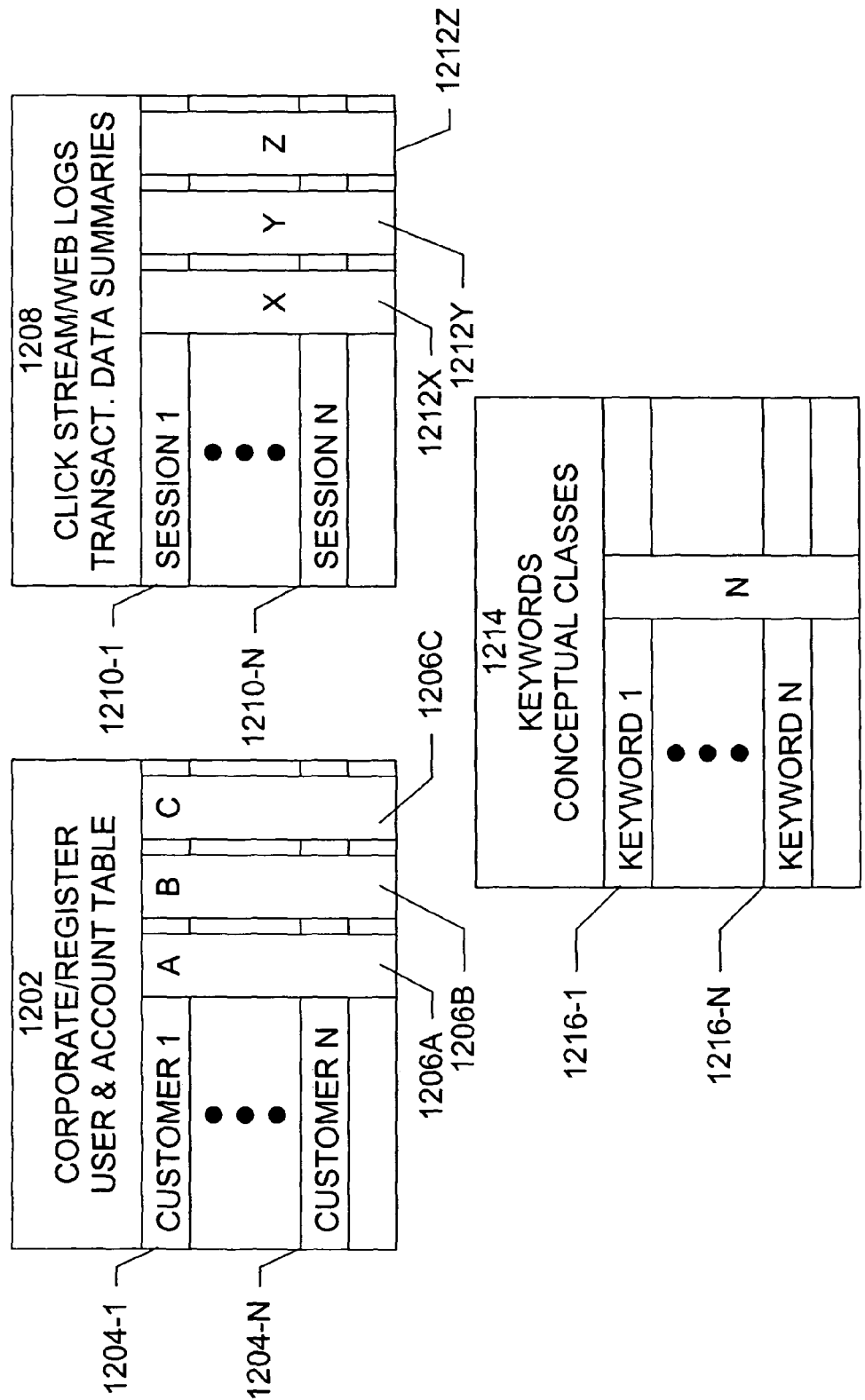
FIG. 12 shows exemplary formats of three types of training data tables.

Generally, the training data can be consolidated in three types of tables shown in FIG. 12. The first type of table is a traditional corporate mining table 1202 in which, for example, each row corresponds to a customer, and each column is an attribute such as age, account type, payment status etc. For example, in table 1202, row 1204-1 corresponds to customer 1, row 1204-N corresponds to customer N, column 1206A corresponds to attribute A, column 1206B corresponds to attribute B, and column 1206C corresponds to attribute C. Examples of account attributes include:

Account-id (unique identifier of customer account)
Customer Name
Customer location
IP (Internet address of customer)

e-mail (e-mail address of customer)

Age (age of customer)

<attribute x> demographics or other account information

<attribute y> demographics or other account information

Account starting date (date the account was created)

Account termination date (date the account was terminated)

Account type (type of customer e.g. individual, company etc.)

Product-list (list of products that the customer has purchased in the past)

The second type of table, such as table 1208, represents entries generated by web sessions, preferably at the fine grain level, which includes flags to indicate if particular web pages were visited, etc. Thus, in table 1208, row 1210-1 corresponds to session 1 and row 1210-N corresponds to session N. Each session is typically associated with a particular user or customer who initiated and/or participated in the session. Likewise, column 1212X corresponds to web page X, column 1212Y corresponds to web page Y, and column 1212Z corresponds to web page Z. There are two sub-types of tables that include data about web sessions. The first is a session mining table, which stores detailed information about a particular session. Examples of data in a session mining table include:

Session (unique identifier if web session).

Account (if available account associated with existing customer).

Items-list (list of items, keywords or products visited, clicked-on or purchased in session).

Item-classes (Taxonomies associated with item and keyword lists).

The second subtype is a session summary mining table, which stores data summarizing a plurality of web sessions. Examples of data in a session summary mining table include:

Account (unique identifier of customer account).

Items-list (list summarizing items from all customer's sessions).

Item-classes (list summarizing taxonomies for all customer's sessions).

List of sessions (list of sessions associated with this account).

The third type of table, such as table 1214, is a conceptual table in which semantic classes mimic the session information of the table 1208, but at a higher level. For example, table 1214 contains keywords that represent membership in general classes, such as 'toys=TRUE', to represent the fact that in one session several hyperlinks leading to toy products were clicked or that the word 'toy' was used in the web server's search engine. Thus, in table 1214, row 1216-1 corresponds to keyword 1 and row 1216-N corresponds to keyword N.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of performing association rule based data mining in an electronic data processing system comprising the steps of:
   providing a dataset comprising a plurality of data entries, each data entry comprising information relating to an item or event;
   counting each occurrence of each item or event in each data entry in the dataset;
   generating, for each item or event, a compilation of data entries that include each item or event;
   determining frequent itemsets, each itemset including a plurality of items or events in the dataset;
   generating a support count for each frequent itemset by determining support counts for a plurality of itemsets in a range of sizes of itemsets in one pass, wherein the support counts of candidates within a particular size range are determined by generating the candidates and arranging them in a lattice; and
   generating and compressing a vertical representation during the one pass.

2. The method of claim 1, wherein the step of counting each occurrence of each item or event in each data entry in the dataset comprises the step of:
   generating a count array comprising a first column including a plurality of identifiers, each identifier identifying an item or event in the dataset, and a second column comprising a plurality of counts, each count indicating a number of occurrences of an item or event identified by a corresponding identifier.

3. The method of claim 2, wherein the step of generating the vertical representation, for each item or event, a compilation of data entries that include each item or event comprises the step of:
   generating the vertical representation comprising a column including a plurality of item or event identifiers, each item or event identifier identifying an item or event in the dataset, and a list including for each item or event identifier an entry identifier of each data entry in the dataset including the item or event identified by the item or event identifier.

4. The method of claim 2, wherein the step of generating, for each item or event, a compilation of data entries that include each item or event comprises the step of:
   generating a vertical representation comprising a column including a plurality of identifiers, each identifier identifying an item or event in the dataset and a list including for each identifier, a bit vector indicating, for each data entry in the dataset, whether the data entry includes the item or event identified by the identifier.

5. The method of claim 2, wherein the compressing step comprises the step of:
   compressing the bit vectors using byte-aligned bitmap compression.

6. The method of claim 2, wherein the step of determining frequent itemsets comprises the steps of:
   generating an array of counts of occurrences of multiple types of items or events in the same data entry.

7. The method of claim 6, wherein the array of counts of occurrences of multiple types of items or events in the same data entry includes only a portion of the occurrences, wherein the occurrences included in the portion occur more frequently than do the occurrences not included in the portion.

8. The method of claim 2, wherein the occurrences included in the portion are determined by counting occurrences of multiple types of items or events in the same data entry for only included items or events as determined using the count array and a minimum support.

9. The system for performing association rule based data mining comprising:
- a processor operable to execute computer program instructions; and
- a memory operable to store computer program instructions executable by the processor, the computer program instructions executable to perform the steps of
- providing a dataset comprising a plurality of data entries, each data entry comprising information relating to an item or event;
- counting each occurrence of each item or event in each data entry in the dataset;
- generating, for each item or event, a compilation of data entries that include each item or event;
- determining frequent itemsets, each itemset including a plurality of items or events in the dataset;
- generating a support count for each frequent itemset by determining support counts for a plurality of itemsets in a range of sizes of itemsets in one pass, wherein the support counts of candidates within a particular size range are determined by generating the candidates and arranging them in a lattice; and
- generating and compressing a vertical representation during the one pass.

10. The system of claim 9, wherein the step of counting each occurrence of each item or event in each data entry in the dataset comprises the step of:
- generating a count array comprising a first column including a plurality of identifiers, each identifier identifying an item or event in the dataset, and a second column comprising a plurality of counts, each count indicating a number of occurrences of an item or event identified by a corresponding identifier.

11. The system of claim 10, wherein the step of generating the vertical representation, for each item or event, a compilation of data entries that include each item or event comprises the step of:
- generating the vertical representation comprising a column including a plurality of item or event identifiers, each item or event identifier identifying an item or event in the dataset, and a list including for each item or event identifier an entry identifier of each data entry in the dataset including the item or event identified by the item or event identifier.

12. The system of claim 10, wherein the step of generating, for each item or event, a compilation of data entries that include each item or event comprises the step of:
- generating a vertical representation comprising a column including a plurality of identifiers, each identifier identifying an item or event in the dataset and a list including for each identifier, a bit vector indicating, for each data entry in the dataset, whether the data entry includes the item or event identified by the identifier.

13. The system of claim 10, wherein the compressing step comprises the step of:
- compressing the bit vectors using byte-aligned bitmap compression.

14. The system of claim 10, wherein the step of determining frequent itemsets comprises the steps of:
- generating an array of counts of occurrences of multiple types of items or events in the same data entry.

15. The system of claim 14, wherein the array of counts of occurrences of multiple types of items or events in the same data entry includes only a portion of the occurrences, wherein the occurrences included in the portion occur more frequently than do the occurrences not included in the portion.

16. The system of claim 10, wherein the occurrences included in the portion are determined by counting occurrences of multiple types of items or events in the same data entry for only included items or events as determined using the count array and a minimum support.

17. A computer program product for performing association rule based data mining in an electronic data processing system, comprising:
- a non-transitory computer readable medium;
- computer program instructions, recorded on the computer readable medium, executable by a processor, for performing the steps of
- providing a dataset comprising a plurality of data entries, each data entry comprising information relating to an item or event;
- counting each occurrence of each item or event in each data entry in the dataset;
- generating, for each item or event, a compilation of data entries that include each item or event;
- determining frequent itemsets, each itemset including a plurality of items or events in the dataset;
- generating a support count for each frequent itemset by determining support counts for a plurality of itemsets in a range of sizes of itemsets in one pass, wherein the support counts of candidates within a particular size range are determined by generating the candidates and arranging them in a lattice; and
- generating and compressing a vertical representation during the one pass.

18. The computer program product of claim 17, wherein the step of counting each occurrence of each item or event in each data entry in the dataset comprises the step of:
- generating a count array comprising a first column including a plurality of identifiers, each identifier identifying an item or event in the dataset, and a second column comprising a plurality of counts, each count indicating a number of occurrences of an item or event identified by a corresponding identifier.

19. The computer program product of claim 18, wherein the step of generating the vertical representation, for each item or event, a compilation of data entries that include each item or event comprises the step of:
- generating the vertical representation comprising a column including a plurality of item or event identifiers, each item or event identifier identifying an item or event in the dataset, and a list including for each item or event identifier an entry identifier of each data entry in the dataset including the item or event identified by the item or event identifier.

20. The computer program product of claim 18, wherein the step of generating, for each item or event, a compilation of data entries that include each item or event comprises the step of:
- generating a vertical representation comprising a column including a plurality of identifiers, each identifier identifying an item or event in the dataset and a list including for each identifier, a bit vector indicating, for each data entry in the dataset, whether the data entry includes the item or event identified by the identifier.

21. The computer program product of claim 18, wherein the compressing step comprises the step of:
   compressing the bit vectors using byte-aligned bitmap compression.

22. The computer program product of claim 18, wherein the step of determining frequent itemsets comprises the steps of:
   generating an array of counts of occurrences of multiple types of items or events in the same data entry.

23. The computer program product of claim 22, wherein the array of counts of occurrences of multiple types of items or events in the same data entry includes only a portion of the occurrences, wherein the occurrences included in the portion occur more frequently than do the occurrences not included in the portion.

24. The computer program product of claim 18, wherein the occurrences included in the portion are determined by counting occurrences of multiple types of items or events in the same data entry for only included items or events as determined using the count array and a minimum support.

* * * * *

UNITED STATES PATENT AND TRADEMARK OFFICE
CERTIFICATE OF CORRECTION

PATENT NO.       : 7,962,483 B1                    Page 1 of 1
APPLICATION NO.  : 10/323997
DATED            : June 14, 2011
INVENTOR(S)      : Thomas It is certified that error appears in the above-identified patent and that said Letters Patent is hereby corrected as shown below:

In column 7, line 56, delete "transaction'?"" and insert -- transaction?" --, therefor.

In column 13, line 6, in Claim 9, delete "The" and insert -- A --, therefor.

Signed and Sealed this
Twenty-fifth Day of October, 2011

David J. Kappos
*Director of the United States Patent and Trademark Office*